United States Patent [19]

Ludwig

[11] 3,994,745
[45] Nov. 30, 1976

[54] SECONDARY BATTERY WITH SEPARATE CHARGE AND DISCHARGE ZONES

[75] Inventor: Frank A. Ludwig, Southfield, Mich.

[73] Assignee: Ford Motor Company, Dearborn, Mich.

[22] Filed: Jan. 30, 1976

[21] Appl. No.: 653,856

[52] U.S. Cl. ................................ 429/81; 429/80; 429/103
[51] Int. Cl.² ........................................ H01M 10/00
[58] Field of Search ............. 136/6 FS, 6 F, 20, 6 R

[56] References Cited
UNITED STATES PATENTS

| | | | |
|---|---|---|---|
| 3,533,848 | 10/1970 | Winn | 136/6 F |
| 3,535,163 | 10/1970 | Dzieciuch et al. | 136/6 FS |
| 3,672,994 | 6/1972 | Mitoff | 136/6 FS |
| 3,758,337 | 9/1973 | Fally et al. | 136/6 FS |

Primary Examiner—John H. Mack
Assistant Examiner—C. F. Lefevour
Attorney, Agent, or Firm—Roger L. May; Keith L. Zerschling

[57] ABSTRACT

A secondary battery comprising: (A) discharge and charge zones containing alkali metal/sulfur cells, the cells in said discharge zone being adapted to operate in a discharge mode and having an electrode which is more readily wet by molten sulfur than by molten polysulfide salts of said alkali metal, and the cells in the charge zone being adapted to operate in a charge mode and having an electrode which is more readily wet by molten polysulfide salts of said alkali metal than by molten sulfur; (B) a storage zone adapted to store molten sulfur and molten polysulfide salts from said cells; (C) means for transporting reactant materials including molten sulfur and molten polysulfide salts of said alkali metal beween said storage zone and said charge and discharge zones; and (D) means for transporting molten alkali metal from said charge zone to said discharge zone.

31 Claims, 7 Drawing Figures

U.S. Patent  Nov. 30, 1976  3,994,745
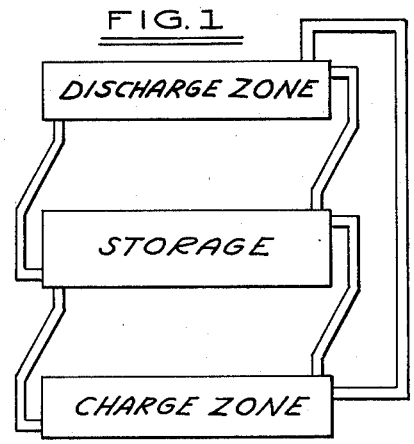
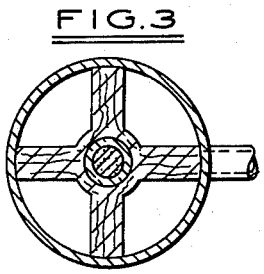
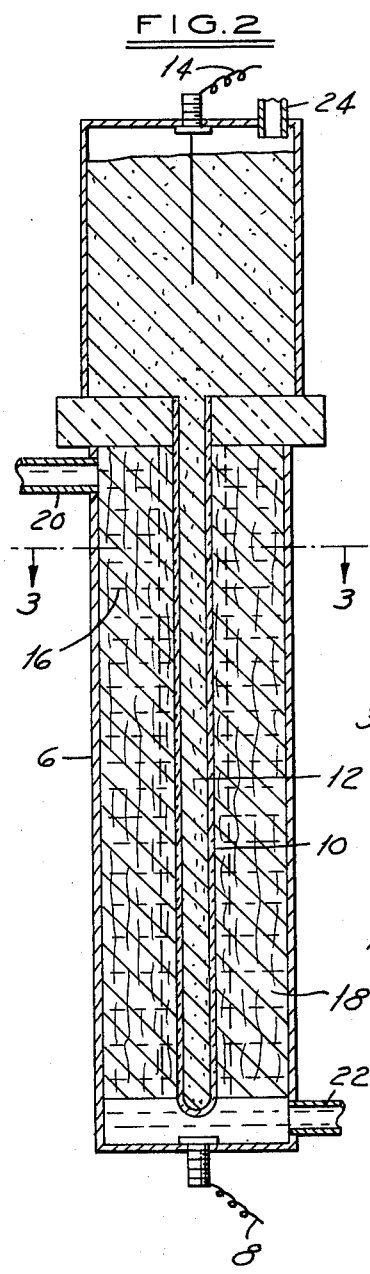
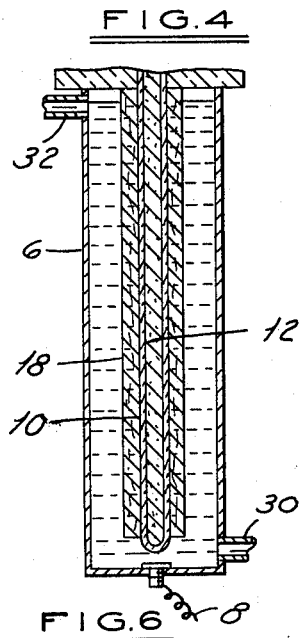
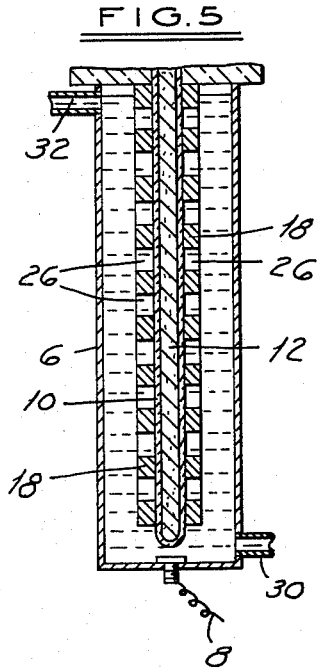
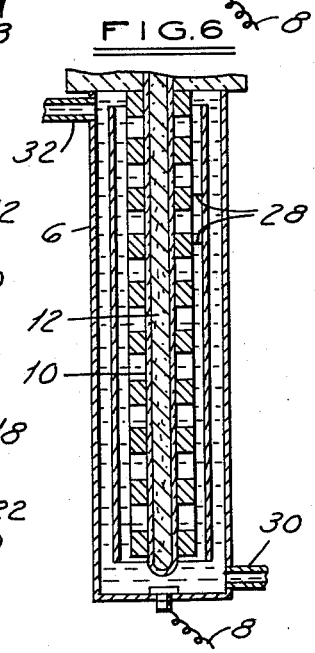
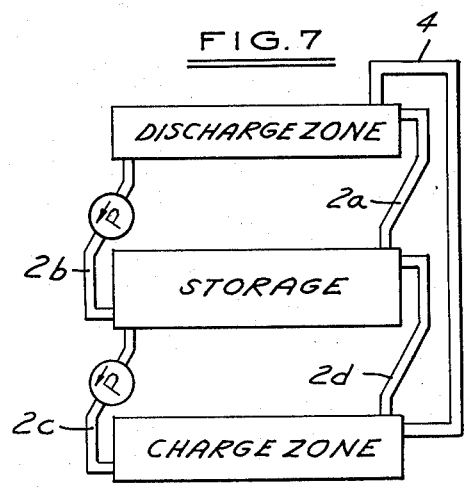

SECONDARY BATTERY WITH SEPARATE CHARGE AND DISCHARGE ZONES

The invention herein described was made in the course of or under a contract or subcontract thereunder with the National Science Foundation.

This application relates to a secondary battery containing at least two cells of the type comprising at least one molten alkali metal anode, at least one cathode, a liquid electrolyte electrochemically reversibly reactive with said alkali metal and in contact with said cathode, and a cation-permeable barrier to mass liquid transfer interposed between and in contact with said anode and said liquid electrolyte.

More particularly, this application relates to a secondary battery which exhibits increased energy efficiency on both charge and discharge.

Still more particularly this application relates to a secondary battery which achieve increased efficiency on both charge and discharge as a result of its comprising separate discharge and charge zones, the discharge zone containing one or more cells which include an electrode which is preferentially wet by molten sulfur, and the charge zone containing one or more cells which include an electrode which is preferentially wet by molten polysulfide salts of said alkali metal.

BACKGROUND OF THE INVENTION

A recently developed type of secondary or rechargeable electrical conversion device comprises: (A) an anodic reaction zone containing a molten alkali metal anode-reactant, e.g., sodium, in electrical contact with an external circuit; (B) a cathodic reaction zone containing (i) a cathodic reactant comprising sulfur or a mixture of sulfur and molten polysulfide, which is electrochemically reversibly reactive with said anodic reactant, and (ii) a conductive electrode which is at least partially immersed in said cathodic reactant; and (C) a solid electrolyte comprising a cation-permeable barrier to mass liquid transfer interposed between and in contact with said anodic and cathodic reactions zones. As used herein the term "reactant" is intended to mean both reactants and reaction products.

During the discharge cycle of such a device, molten alkali metal atoms such as sodium surrender an electron to an external circuit and the resulting cation passes through the solid electrolyte barrier and into the liquid electrolyte to unite with polysulfide ions. The polysulfide ions are formed by charge transfer on the surface of the electrode by reaction of the cathodic reactant with electrons conducted through the electrode from the external circuit. Because the ionic conductivity of the liquid electrolyte is less than the electronic conductivity of the electrode material, it is desirable during discharge that both electrons and sulfur be applied to and distributed along the surface of the conductive material in the vicinity of the cation-permeable solid electrolyte. When the sulfur and electrons are so supplied, polysulfide ions can be formed near the solid electrolyte and the alkali metal cations can pass out of the solid electrolyte into the liquid electrolyte and combine to form alkali metal polysulfide near the solid electrolyte.

During the charge cycle of such a device when a negative potential larger than the open circuit cell voltage is applied to the anode the opposite process occurs. Thus electrons are removed from the alkali metal polysulfide by charge transfer at the surface of the electrode and are conducted through the electrode material to the external circuit, and the alkali metal cation is conducted through the liquid electrolyte and solid electrolyte to the anode where it accepts an electron from the external circuit. Because of the aforementioned relative conductivities of the ionic and electronic phases, this charging process occurs preferentially in the vicinity of the solid electrolyte and leaves behind molten elemental sulfur. As can be readily appreciated the production of large amounts of sulfur near the surface of the cation-permeable membrane has a limiting effect on rechargeability. This is the case since sulfur is nonconductive and when it covers surfaces of the electrode, charge transfer is inhibited and the charging process is greatly hindered or terminated. Thus, in order to improve the rechargeability of a cell of this type it is necessary not only to supply polysulfide to the surface of the porous electrode in the vicinity of the cation-permeable membrane, but also to remove sulfur therefrom.

U.S. Pat. No. 3,811,493 and U.S. patent application Ser. No. 545,048 filed Jan. 29, 1975 both disclose energy conversion device designs which allow or promote improved mass transportation of reactants and charge thus increasing both energy efficiency and the ampere-hour capacity of the device. In the device disclosed in the patent an ionically conductive solid electrolyte is located between a first reactant in one container and a second reactant in another container. An electrode for one of the reactants comprises a layer of porous, electronically conductive material having one surface in contact with one side of the ionically conductive solid electrolyte and the other surface in contact with a structurally integral electronically conductive member permeable to mass flow of its reactant and electrically connected to the external circuit. An open volume exists between the structurally integral conductive member and the container wall to promote free flow and mixing of the reactant. Reactants also flow readily through the conductive member into the layer of porous electronically conductive material. The conductive member distributes electrons to the porous, conductive material which in turn transfers electrons to or from the reactants.

The improvement disclosed in the patent application comprises designing the cathodic reaction zone of the device such that there are a plurality of channels and/or spaces within said zone which are free of porous conductive electrodes and which are thus adapted to allow free flow of the molten cathodic reactants during operation of the device. This flow results from free convection within the channels and/or spaces, and from wicking of cathodic reactants within the conductive porous material.

U.S. patent applications Ser. No. 567,464 filed Apr. 14, 1975 and Ser. Nos. 604,941 and 605,942 filed Aug. 20, 1975 all teach ways of increasing mass transportation of reactants in such a device, thus increasing the ampere-hour capacity of the battery or cell and, to an extent, the charge/discharge energy efficiency. However, each of these modifications relies on vapor transport of sulfur to accomplish its purpose and, as such, involves either external heating or special cell design.

The prior art designs or methods disclosed and claimed in the aforementioned U.S. patent and in Ser. Nos. 545,048, 605,941 and 605,942 are all effective in promoting distribution of reactants during both discharge and charge. However, even with these improved designs or methods it is difficult to recharge the batteries or cells at high rates.

U.S. patent application Ser. No. 653,865 entitled "Secondary Battery or Cell with Polysulfide Wettable Electrode" filed concurrently herewith teaches a secondary battery or cell employing an electrode which is preferentially wet by polysulfide. As a result the cell exhibits a high energy efficiency on charge. The use of such a polysulfide wettable, electrode, however, while increasing charge efficiency, results in appreciable electrode polarization and somewhat decreased efficiency on discharge.

U.S. patent application Ser. No. 653,857 entitled "Secondary Battery or Cell with Dual Electrode" and also filed concurrently herewith teaches a battery or cell in which each cell contains two separate electrodes, one being preferentially wet by polysulfide and being adapted to operate on charge and the other being preferentially wet by sulfur and being adapted to operate on discharge. While such batteries or cells are effective in increasing energy efficiency on both charge and discharge, the cell construction is complicated by the use of two separate electrodes.

The secondary battery of this invention, like that of the dual electrode device, increases energy efficiency on both charge and discharge. However, unlike that device, the improved battery of this invention does not require construction of individual cells containing two separate electrodes.

BRIEF DESCRIPTION OF THE INVENTION

The secondary battery of this invention comprises: (A) discharge and charge zones containing alkali metal/sulfur cells, the cells in said discharge zone being adapted to operate in a discharge mode and having an electrode which is more readily wet by molten sulfur than by molten polysulfide salts of said alkali metal, and the cells in the charge zone being adapted to operate in a charge mode and having an electrode which is more readily wet by molten polysulfide salts of said alkali metal than by molten sulfur; (B) a storage zone adapted to store molten sulfur and molten polysulfide salts from said cells; (C) means for transporting reactant materials including molten sulfur and molten polysulfide salts of said alkali metal between said storage zone and said charge and discharge zones; and (D) means for transporting molten alkali metal from said charge zone to said discharge zone.

The invention will be more fully understood after reading the following detailed description thereof in conjunction with the drawings in which:

FIGS. 1 and 7 are schematic diagrams of devices in accordance with this invention;

FIGS. 2, 4, 5 and 6 show various cell designs useful for cells in the charge and discharge zones of the battery in accordance with the invention; and FIG. 3 is a cross-section of FIG. 2 taken along line 3—3 thereof.

DETAILED DESCRIPTION OF THE INVENTION

Types of Cell Employed

The general types of cell which are employed in the battery of this invention are disclosed in the following United States patents, the disclosures of which are incorporated herein by reference: U.S. Pat. Nos. 3,404,035; 3,404,036; 3,446,677; 3,458,356; 3,468,709; 3,468,719; 3,475,220; 3,475,223; 3,475,225; 3,535,163; 3,719,531 and 3,811,493.

The type of cells which may be adapted for use in the improved battery of this invention comprise generally: (1) an anodic reaction zone containing a molten alkali metal reactant-anode adapted to be in electrical contact with an external circuit; (2) a cathodic reaction zone containing (a) a cathodic reactant comprising a liquid electrolyte selected from sulfur or a mixture of sulfur and sulfur saturated polysulfide of said molten alkali metal reactant which is electrochemically reversibly reactive with said anodic reactant and (b) an electrode which is at least partially immersed in said cathodic reactant and (3) a cation-permeable barrier to mass liquid transfer interposed between and in contact with said anodic and cathodic reaction zones, said electrode being in electrical contact with both said cation-permeable barrier and adapted to be in electrical contact with the external circuit.

The anodic reactant employed in such cells is an alkali metal which is maintained above its melting point when the device is in operation. The anodic reactant is heated by any conventional means including, not by way of limitation, Joule heating, induction heating, and heat exchange with a suitable fluid. The anodic reactant may also be viewed as the anode proper or conductor through which the electron flow to the external circuit is achieved. A cell component of this type is conventionally referred to in the art as a sacrificial electrode in that while it is serving the role of a conductor, it is also undergoing electrochemical reaction. Molten sodium is employed as the anodic reactant is most preferred embodiments of such cells. However, potassium, lithium, other alkali metals, mixtures of such alkali metals, or alloys containing such alkali metals can be used.

The cathodic reactant of the fully charged cell is molten sulfur, which is electrochemically reversibly reactive with the anodic reactant. As such a cell begins to discharge, the mole fraction of elemental sulfur drops while the open circuit voltage remains constant. During this portion of the discharge cycle as the mole fraction of sulfur drops from 1.0 to approximately 0.72 the cathodic reactant displays two phases, one being essentially pure sulfur and the other being sulfur saturated alkali metal polysulfide in which the molar ratio of sulfur to alkali metal is about 5.2:2. When the cell is discharged to the point where the mole fraction of sulfur is about 0.72 the cathodic reactant becomes one phase in nature since all elemental sulfur has formed polysulfide salts. As the cell is discharged further, the cathodic reactant remains one phase in nature and as the mole fraction of sulfur drops so does the open circuit voltage corresponding to the change in the potential determining reaction. Thus, the cell continues to discharge from a point where polysulfide salts contain sulfur and alkali metal in a molar ratio of approximately 5.2:2 to the point where polysulfide salts contain sulfur and alkali metal in a ratio of about 3:2. At this point the cell is fully discharged.

Since in the fully discharged state the polysulfide melts is single phase in nature, the activity of sulfur in the melt is substantially less than unity when the mole fraction of sulfur is about 0.60 and approaches unity as the mole fraction approaches 0.72, the point at which the polysulfide is sulfur saturated. As the cell is recharged, elemental sulfur is formed momentarily on the surfaces of the electrode in the vicinity of the solid ceramic electrolyte. Since sulfur is nonconductive, the presence of elemental sulfur on the electrode could cause difficulty in continuing the recharging process. However, when the mole fraction of sulfur in the melt is between about 0.60 and about 0.72, i.e., the single phase region, the sulfur which forms on the surface of the electrode tends to react immediately with the polysulfide melt in the vicinity thereof to form a second polysulfide in which the molar ratio of sulfur to alkali metal is greater than 3:2. This process occurs until the molar ratio of sulfur to alkali metal is approximately 5.2:2. This is the point where the mole fraction of sulfur is approximately 0.72 and the open circuit voltage becomes constant.

As charging of the cell continues, the sulfur saturated polysulfide will no longer react with elemental sulfur deposited on the electrode to form polysulfide having a greater mole ratio of sulfur to alkali metal. Thus, as the charging cycle continues the cathodic reactant becomes two phase in nature. One phase is elemental sulfur and the other is sulfur saturated alkali metal polysulfide in which the molar ratio of sulfur to alkali metal is about 5.2:2, with the molar fraction of sulfur in the cathodic reaction zone continually increasing as the recharging cycle progresses. It is in this region of the recharging cycle that substantial difficulties are confronted because of the formation of large amounts of nonconductive elemental sulfur on porous electrode surfaces. In fact, it is extremely difficult without some modification of this type of cell to recharge to any great extent past the point at which the polysulfide becomes saturated with sulfur and thus the deposition of elemental sulfur has a limiting effect on rechargeability.

The anodic reactant is separated from the cathodic reactant by a solid barrier to mass liquid transfer that is selectively ionically conductive with respect to cations of the anodic reactant and substantially impermeable to other ions which may be stored in the cathodic reactant. Thus, the reaction zone separator or solid electrolyte is a material which will permit the transfer of the ions of the anodic reactant through the separator and into the cathodic reactant during operation of the device. The cathodic reactant together with the separator provides a sufficient barrier to free electron flow in the internal portion of the electrical circuit to permit a difference of potential to develop at the respective electrodes of the devices in operation. It is preferred that the separator be as thin as possible without unduly sacrificing strength. Although optimum thickness may vary with intended use, separators having a thickness in the range of about 20 to about 2,000, preferably about 100 to about 1,000, microns have been found to be effective.

Both glasses and polycrystalline ceramic materials have been found suitable for use in such cells as the solid electrolyte or reaction zone separators. Among the glasses which may be used with such cells and which demonstrate an unusually high resistance to attack by molten alkali metal are those having the following composition: (1) between about 47 and about 58 mole percent sodium oxide, about 0 to about 15, preferably about 3 to about 12, mole percent of aluminum oxide and about 34 to about 50 mole percent of silicon dioxide; and (2) about 35 to about 65, preferably about 47 to about 58, mole percent sodium oxide, about 0 to about 30, preferably about 20 to about 30, mole percent of aluminum oxide, and about 20 to about 50, preferably about 20 to about 30, mole percent boron oxide. These glasses may be prepared by conventional glass making procedures using the listed ingredients and firing at temperatures of about 2700° F.

The polycrystalline ceramic materials useful as reaction zone separators of solid electrolytes are bi- or multi-metal oxides. Among the polycrystalline bi- or multi-metal oxides most useful in the cells to which the invention applies are those in the family of Beta-alumina all of which exhibit a generic crystalline structure which is readily identifiable by X-ray diffraction. Thus, Beta-type alumina or sodium Beta-type-alumina is a material which may be thought of as a series of layers of aluminum oxide held apart by columns of linear Al—O bond chains with sodium ions occupying sites between the aforementioned layers and columns. Among the numerous polycrystalline Beta-type-alumina materials useful as reaction zone separators or solid electrolytes are the following:

1. Standard Beta-type-alumina which exhibits the above-discussed crystalline structure comprising a series of layers of aluminum oxide held apart by layers of linear Al—O bond chains with sodium occupying sites between the afore-mentioned layers and columns. Beta-type-alumina is formed from compositions comprising at least about 80% by weight, preferably at least about 85% by weight, of aluminum oxide and between about 5 and about 15 weight percent, preferably between about 8 and about 11 weight percent, of sodium oxide. There are two well known crystalline forms of Beta-type-alumina, both of which demonstrate the generic Beta-type-alumina, crystalline structure discussed hereinbefore and both of which can easily be identified by their own characteristic X-ray diffraction pattern. Beta-alumina is one crystalline form which may be represented by the formula $Na_2O \cdot 11Al_2O_3$. The second crystalline is $\beta''$-alumina which may be represented by the formula $Na_2O \cdot 6Al_2O_3$. It will benoted that the $\beta''$ crystalline form of Beta-type-alumina contains approximately twice as much soda (sodium oxide) per unit weight of material as does the Beta-alumina. It is the $\beta''$-alumina crystalline structure which is preferred for the formation of solid electrolyte or reaction zone separators for the device to which the process of this invention is applicable. In fact, if the less desirable beta form is present in appreciable quantities in the final ceramic, certain electrical properties of the body will be impaired.

2. Boron oxide $B_2O_3$ modified Beta-type-alumina wherein about 0.1 to about 1 weight percent of boron oxide is added to the composition.

3. Substituted Beta-type-alumina wherein the sodium ions of the composition are replaced in part or in whole with other positive ions which are preferably metal ions.

4. Beta-type-alumina which is modified by the addition of a minor proportion by weight of metal ions having a valence not greater than 2 such that the modified Beta-type alumina composition comprises a major proportion by weight of ions of aluminum and oxygen and a minor proportion by weight of a metal ion in crystal lattice combination with cations which migrate in relation to the crystal lattice as a result of an electric field, the preferred embodiment for use in such electrical conversion devices being wherein the metal ion having a valence not greater than 2 is either lithium or magnesium or a combination of lithium and magnesium. These metals may be included in the composition in the form of lithium oxide or magnesium oxide or mixtures thereof in amounts ranging from 0.1 to about 5 weight percent.

The cathodic electrode is in electrical contact with the cation-permeable barrier and adapted to be in electrical contact with the external circuit. The cathode material generally comprises any porous material which is electronically conductive and which is resistant to attack by reactants within the cathodic reaction zone.

While the cells which may be adapted for use in the improved battery of this invention may have a number of different configurations, several of which are disclosed in the above-incorporated patents, a preferred configuration comprises: (1) a container, preferably tubular; (2) a cation-permeable barrier to mass liquid transfer, preferably tubular, which is disposed within said container so as to create an anodic reaction zone within said barrier and a cathodic reaction zone between said barrier and said container; (3) a molten alkali metal anodic reactant within said anodic reaction zone in electrical contact with an external electrical circuit; (4) a cathodic reactant comprising a liquid electrolyte which is electrochemically reversibly reactive with said anodic reactant and which, in at least the partially discharged state is selected from the group consisting of (a) a single phase composition comprising molten polysulfide salts of said anodic reactant and (b) a two phase composition comprising molten sulfur and molten sulfur saturated polysulfide salts of said anodic reactant; and (5) an electrode which is disposed within said cathodic reaction zone, filled at least in part with said cathodic reactant and is in electrical contact with both said barrier and said external circuit. Such secondary cells which are preferably tubular or cylindrical, thus comprise cathodic reaction zones which completely surround the solid electrolyte or reaction zone separator.

Improvement of the Invention

The improved battery of this invention, which is schematically illustrated in FIG. 1, comprises: a discharge zone; a charge zone; a storage zone adapted to store cathodic reactant; means 2 for transporting said cathodic reactant between said storage zone and said charge and discharge zones; and means 4 for transporting alkali metal-anodic reactant from said charge zone to said discharge zone. Each of the charge and discharge zones of said battery comprises one or more cells of the general type hereinbefore described by with certain modifications in accordance with the invention. Thus, each of the cells comprises: (1) one or more anodic reaction zones containing a molten alkali metal reactant-anode which is adapted to be in electrical contact with an external circuit, (2) one or more cathodic reaction zones containing a cathodic reactant which is electrochemically reversibly reactive with said anodic reactant and which, when the cell is in operation comprises a composition selected from the group consisting of (i) a single phase composition comprising molten polysulfide salts and (ii) a two phase composition comprising molten sulfur and molten sulfur saturated polysulfide salts of said anodic reactant; (3) a cation-permeable barrier to mass liquid transfer interposed between and in contact with said anodic and cathodic reaction zones; (4) and electrode which is (i) disposed within said cathodic reaction zone, (ii) filled, at least in part, with said cathodic reactant, (iii) in electrical contact with said cation-permeable barrier and (iv) adapted to be in electrical contact with said external circuit; and (5) inlet and outlet means for flowing said cathodic reactant into and out of said cathodic reaction zones of said cells. The cells of said discharge zone also include an inlet means for flowing the anodic reactant from the means 4 for transporting anodic reactant into the anodic reaction zones of said cells while the cells of said charge zone include an outlet means for flowing anodic reactant from the anodic reaction zone thereof to means 4 for transporting anodic reactant.

The cells of the discharge zone of the battery of the invention are adapted by means of appropriate circuitry, which will be apparent to one skilled in this art, to operate only in a discharge mode. The electrode of those cells comprises a conductive material, which during operation of the cell, is more readily wet by molten sulfur than it is by molten polysulfide salts.

The cells of the charge zone of the battery are adapted by appropriate circuitry to operate only in a charge mode. The electrode of those cells comprises a conductive material which is more readily wettable by molten polysulfide salts than by molten sulfur.

The measure of wettability of a substrate by a liquid material is the contact angle formed between the liquid and the substrate. If the liquid completely wets the substrate, the contact angle will be 0°. If the liquid beads up completely on the substrate surface, the contact angle will be 180°. Thus, the lower the contact angle between the liquid and the substrate the greater the wettability of the substrate by the liquid. For example, in helium at 318° C the contact angle formed by molten $Na_2S_4$ on graphite is approximately 100° while the contact angle formed by molten sulfur on graphite is approximately 25°. Thus, graphite is preferentially wet by sulfur as opposed to polysulfide salt and, as such, is suitable for use as the electrode for cells in the discharge zone, but not as the electrode for cells in the charge zone.

It has been found that by employing conductive materials which are preferentially wettable by polysulfide salts and by sulfur as the electrodes of the cells in the charge and discharge zones respectively it is possible to substantially reduce or eliminate electrode polarization while either charging or discharging the battery. As a result, the battery of the invention demonstrates good electrical efficiency on both charge and discharge and, as such, is ideal for a number of uses such as for electric utility load levelling.

The electrode used in the cells of the charge zone (the charging electrode) is identical with the electrode used in the device described in the aforementioned concurrently filed application entitled "Secondary Battery or Cell with Polysulfide Wettable Electrode". Such as electrode may be disposed in a variety of patterns in the cell and preferably is selected from the group consisting of:

1. Porous conductive material which is disposed within the cathodic reaction zone in the manner disclosed in U.S. patent application Ser. No. 545,048 mentioned previously such that the cathodic reaction zone contains a plurality of channels or spaces which are free of said porous conductive material and which, in combination with said porous conductive material are adapted to allow flow within said cathodic reaction zone of said cathodic reactant during operation of the battery or cell. The term "porous conductive material" as used in this application is intended to mean any of the compositions within the purview of the invention which is in the form of a perforated material, an expanded material; a felt; a woven or nonwoven fabric; a sintered material, a foam, a flame sparyed material and other forms which will be apparent to the skilled artisan.

2. Porous conductive material which is disposed within said cathodic reaction zone such that it is confined to an area of the cathodic reaction zone which is adjacent to the cation-permeable barrier. For example, a perforated or expanded metal sheet, such as stainless steel, may be disposed so as to be contiguous with said barrier, but not with the outer container wall. Thus, in the preferred tubular configuration for cells of the type to which the improvement relates, the perforated or expanded metal sheet could be wrapped around the cation-permeable barrier. An advantage which is achieved by positioning the electrode adjacent or contiguous to the cation-permeable barrier is that wetting by polysulfide is enhanced by the capillarity between the electrode material and the barrier.

3. Conductive material which is disposed such that there are two major electrode portions, the first portion being porous conductive material which is confined to an area of said cathodic reaction zone adjacent to said cation-permeable barrier and the second being conductive material which is electrically connected to said first portion, but which is spaced from said first portion so as to create a channel therebetween. In a preferred embodiment both portions may be formed of a metal such as stainless steel. Thus, in the preferred tubular configuration discussed previously, a preforated or expanded metal sheet is wrapped around the cation-permeable barrier and a metal cylinder, which may or may not be perforated, is disposed concentrically about and spaced from the wrapped barrier.

Among the numerous materials which are preferentially wettable by polysulfide salts and which should be apparent to those skilled in the are are:

1. Metals, which as used herein shall include alloys as well as such metals or alloys having an oxidized surface(s). A preferred metal for use in the invention is stainless steel. It has been found, for example, that no electrode polarization occurs at a stainless steel AISI No. 446 electrode at 330° C while charging in the two phase region. The contact angle in helium at 318° C formed by molten $Na_2S_4$ on AISI No. 446 stainless steel is 0°–5°, while the contact angle formed by sulfur on stainless steel is approximately 25°. These contact angles remain the same independent of the thickness of the oxide layer on the stainless steel (i.e., the virgin stainless steel can be abraded so as to remove old oxide, can be oxidized in hot nitric acid, etched in HCl, oxidized in air at 800° C, or used untreated). Thus, in all cases the stainless steel is preferentially wetted by sodium polysulfide. All metals which have been exposed to air are covered to a greater or lesser extent, depending on the particular metal, with an oxide coating. Since oxides are particularly stable to molten sulfur and molten alkali metal polysulfides, such as sodium polysulfides, it becomes advantageous to further oxidize the metal surfaces, either by oxidation at elevated temperatures or by attack by oxidizing acids. It is understood that metals and alloys, as used herein, can be either coated with oxide due to normal exposure to an ambient atmosphere or may be specially treated to thicken their oxide coatings.

2. Materials having a surface comprising, and including materials formed completely of, a composition of a polar or ionic character or with unfilled d-orbitals. Such compositions include oxides or sulfides of metals selected from the group consisting of a) Metals of Groups I, II, and III of the Periodic Table of Elements, b) Transition Series Metals and c) tin, lead, antimony and bismuth. Preferably the metal salts or oxides are highly insoluble in the sulfur and polysulfide phases. Preferred materials are: aluminum oxide ($Al_2O_3$), molybdenum disulfide ($MoS_2$), chromium trioxide ($Cr_2O_3$) lanthanum chromite ($LaCrO_3$), calcium doped lanthanum chromite ($La_{1-x}Ca_xCrO_3$), antimony pentoxide doped tin oxide ($Sb_2O$—$SnO_2$), lithium doped nickel oxide ($Li_xNi_{1-x}O$), titanium doped iron oxide ($Ti_x$-$Fe_{2-x}O_3$), and tantalum doped titanium oxide ($Ta_2O_5$—$TiO_2$). Most of these materials are electronic conductors and can, therefore, serve as the electrode or can completely coat the electrode. Others of these materials such as aluminum oxide or chromium trioxide, are insulators and must, therefore, only partially cover the electrode surface.

3. Surface oxidized graphite. Graphite oxide can be prepared by the standard methods (e.g., graphite in a 1:2 v/v mixture of concentrated nitric and sulfuric acids with solid potassium chlorate added, or graphite in sulfuric acid containing sodium nitrate and potassium permanganate). Treatment of the graphite must be brief so that only the surface is oxidized. When this material is used as an electrode in an alkali metal/sulfur cell and heated in the presence of the cathodic reactant to operating temperatures, the graphitic oxide surface converts to graphite sulfide which is preferentially wet by the polysulfide.

4. Electrically conducting intercalated graphite. Graphite bromine is formed by exposure of graphite felt electrodes to either liquid bromine or bromine vapor. Considerable bromine is retained in the graphite at the operating temperature of the cell. The graphite bromine surface is more wettable by polysulfides than the untreated graphite. Many materials can be reversibly intercalated in graphite. These materials all tend to make graphite more wettable by polysulfides. The intercalated graphite is prepared by heating the materials with the graphite. Some of the more desirable intercalating materials are: $FeCl_3$, $CrO_3$, $V_2S_3$, $MoO_3$, $Sb_2S_5$, $FeCl_3$/$AlCl_3$, and $CoCl_3$.

5. Graphite which bears a continuous or discontinuous coating of one or more of the materials of (1), (2), (3) or (4). Thermal decomposition and oxidation methods for coating substrates, such as graphite electrodes with metal oxides are U.S. Pat. Nos. 2,615,932, 2,669,598 and 3,077,507. Other methods, such as flame spraying or chemical vapor deposition are well known in the art. It will be appreciated that, as mentioned above, when the coating to be applied is insulating in nature it must be applied discontinuously.

6. A combination or mixture of the materials of (1), (2), (3), (4) or (5). Particularly preferred members of this category are metals of (1) which have been further oxidized and doped by the class of materials given in (2). For example, a nickel metal electrode can be oxidized at high temperature in the presence of nickel nitrate and lithium nitrate, resulting in a lithium doped nickel oxide-nickel electrode.

Several particularly preferred designs for the charging electrode are:

1. A design wherein the electrode comprises a layer of felt of a perforated or expanded metal, such as stainless steel, which is confined to an area adjacent the cation-permeable barrier. More specifically, the electrode material in such a design may be wrapped around the cation-permeable barrier.
2. A design wherein the electrode comprises a first portion, such as a layer of felt or a perforated expanded metal, which is confined to an area adjacent the cation-permeable barrier and which is contiguous with said cation-permeable barrier and a second portion formed of conducting material such as metal which is spaced from the first portion so as to form a channel therebetween, but which is electrically connected thereto. The second portion may or may not be porous or perforated. In the preferred tubular type of battery or cell the second portion may be a cylinder which is concentrically disposed about and spaced from the cation-permeable barrier.

If the charge electrode of the improved device of the invention is formed of a material, such as stainless steel, which tends to corrode somewhat on discharge when the sodium/sulfur ratio in the polysulfide is in a certain range even though it is not in use and the charge zone is not closed off during discharge as discussed hereinafter, it may then be desirable to maintain a continuous low charging current or trickle charge flowing through said first electrode even during discharge of said battery or cell. There is no particular limitation on the trickle charge current density, but a convenient current would be one percent (1%) or less of the discharging current.

The electrode used in the cells of the discharge zone (the discharging electrode) is disclosed in the aforementioned concurrently filed application entitled "Secondary Battery or Cell with Dual Electrode." This discharging electrode preferably comprises porous conductive material which is disposed within the cathodic reaction zone of the cell such that the zone contains a plurality of channels or spaces which are free of said porous conductive material and which, in combination with said porous conductive material, are adapted to allow flow with said reaction zone of said cathodic reactant during operation of the cell. Such a disposition of an electrode within a cathodic reaction zone is taught by Ser. No. 545,048.

The various materials which will exhibit the required preferential wettability by sulfur and which, therefore, are suitable as the discharge electrode will be apparent to those skilled in the art. However, some preferred materials include graphite felt or foam, porous graphite, vitreous carbon foam, pyrolytic graphite felt or foam rigidized graphite felt or or foam, or materials which have been covered or coated with the above carbon materials.

FIG. 2 shows a full vertical cross-section of a cell which is representative of the tubular type which is preferred for use in the charge and discharge zones of the improved battery of this invention. The cell will be described as a cell for use in the discharge zone. FIG. 3 is a cross-section of the cell of FIG. 2 taken along line 3—3 FIGS. 4, 5 and 6 show broken away lower vertical sections of cells similar to that of FIG. 2, but adapted to be use in the charge zone of the battery. To the extent that a part or material shown in each Figure is the same as that in the cell of FIG. 1, it will be designated by the same numeral used to described FIG. 1.

The cell shown in FIG. 2 comprises: a tubular container 6 which may be in electrical contact with an external circuit via electrode lead 8; a tubular cation-permeable barrier to mass liquid transfer 10 which is disposed within said tubular container 4 so as to create an anodic reaction zone within the tubular barrier containing a molten alkali metal reactant-anode 12 which is in electrical contact via lead 14 to an external circuit; a cathodic reaction zone between tubular barrier 10 and tubular container 6; a molten cathodic reactant 16 and a porous electrode 18 which is disposed within the cathodic reaction zone.

FIG. 2 and its cross-section FIG. 3 are representative of the type of cell design disclosed in Ser. No. 545,048 discussed above wherein porous conductive material 14 is disposed within the cathodic reaction zone such that said zone contains a plurality of channels or spaces 16 which are free of said porous conductive material and which, in combination with said porous conductive material are adapted to allow flow within said cathodic reaction zone of said cathodic reactant during operation of the battery or cell.

FIG. 2, in addition to the features discussed above, as a cell for use in the discharge zone, includes inlet means 20 for flowing cathodic reactant into the cathodic reaction zone, outlet means 22 for flowing cathodic reactant out of said cathodic reaction zone and inlet means 24 for flowing anodic reactant 12 into said anodic reaction zone.

FIGS. 4 and 5, which as mentioned above, show cells which are adpated for use in the charge zone each illustrated electrode designs where porous conductive material 18 is confined to an area adjacent cation-permeable barrier 10. Material 14 is illustrated as a felt in FIG. 4 and as a perforated metal sheet with openings 26 in FIG. 5.

FIG. 6 shows a cell design where, in addition to a first portion of porous conductive material 18 confined to the area adjacent the barrier 10, there is a second conductive material 18' which may or may not be porous. In the embodiment illustrated, the material 18' is a perforated metal sheet and the material 18' is a solid cylinder of metal which is disposed such that a cathodic reactant can flow around it at the top and bottom of the cathodic reaction zone. Material 18' may also be porous or perforated to allow flow or reactant therethrough. In any event, however, the disposition of materials 18 and 18' as illustrated does not create a vertical channel in the cell such that a chimney effect is created, thus increasing free convective flow of reactants. Electrode material 18' and electrode material 18, of course, are electrically connected such as by wires 28.

FIGS. 4, 5 and 6, in addition to the features discussed above, as cells for use in the charge zone, include inlet means 30 for flowing cathodic reactant into said cathodic reaction zone and outlet means 32 for flowing cathodic reactant out of said cathodic reaction zone.

The schematic of FIG. 1 illustrates the portion of the various zones in a preferred embodiment of the battery of the invention. In that preferred embodiment the device is oriented in a gravitational field with the discharge zone at the top, the charge zone at the bottom and the storage zone between the two. This arrangement of the zones promotes the natural free convection of the cathodic reactant. As mentioned above, the device includes means 2 for flowing cathodic reactants between the storage zone and the charge and discharge zones. In accordance with the invention means 2 for transporting cathodic reactant must comprise at least one elongated conduit between the storage zone and the discharge zone and at least one elongated conduit between the storage zone and the charge zone. The device schematically shown in FIG. 1 comprises two conduits 2a and 2b between the storage zone and the discharge zone and two conduits 2c and 2d between the storage zone and the charge zone. The use of these pairs of conduits and their disposition within the device promotes free convection as will be described further hereinafter. The use of conduits with elongated sections also enhances free convection due to the increased pressure differential resulting from the "chimney effect" obtained by increased vertical distances.

In the theoretically fully charged state the storage zone as well as the cathodic reaction zone of all cells in both the discharge and charge zones of the battery may be filled with sulfur. As mentioned previously, the cells in the discharge zone are adapted by appropriate circuitry to operate in a discharge mode. Thus, during discharge polysulfide is formed in each of the cathodic reaction zones of the discharge cells. This material, being heavier than sulfur tends to sink and flow out of said discharge cell through outlet 22. The heavier polysulfide from all of the discharge cells is collected in the discharge zone and flows through conduit 2b to the storage zone as indicated. The polysulfide, being more dense than sulfur accumulates in the bottom of the storage zone and forces sulfur through conduit 2a to the discharge zone where the sulfur is distributed to the cathodic reaction zones of the discharge cells via inlets 20. This process will continue by free convection until the storage zone is entirely filled with polysulfide.

During the charge cycle of the battery of the invention conduits 2c and 2d to the charge zone, which preferably have been closed during the discharge cycle, are opened. Polysulfide then flows from the bottom of the storage zone through conduit 2c to the charge zone where it enters the lower portion of the cathodic reaction zone of the charge cells through inlet 30. As the cells charge sulfur is formed therein, rises to the top of the cells since it is 1 lighter than polysulfide, passes out of outlets 32, is collected and flows through conduit 2d back to the storage zone. This process continues until the storage zone is once again filled with sulfur.

Suitable means for distributing cathodic reactant from conduits 2a and 2c to inlet means 20 and 30 of the discharge and charge cells respectively and outlet means 22 and 32 of discharge and charge cells respectively to conduits 2b and 2d will be apparent to one skilled in the art. One preferred means comprises the use of upper and lower manifold reservoirs in both the discharge and charge zones. When such means are employed, the upper manifold reservoir in the discharge zone and lower manifold reservoir in the charge zone are adpated to (i) receive cathodic reactant from from the conduits 2a and 2c respectively and (ii) feed that reactant so received into cells through inlet means 20 and 30. The lower manifold reservoir in the discharge zone and the upper manifold reservoir in the charge zone are then adapted to (i) receive cathodic reactant from the cells through outlets 22 and 32 and (ii) feed the reactant through conduits 2b and 2d to the storage zone.

Considerably high convective velocities are achieved with the device of this invention because of the aforementioned chimney effect. Also, the formation of sulfur vapor enhances convective mass transport. However, the benefits of free convection for mass transport are enjoyed primarily when the battery is operating in the two phase region. The free convection between the discharge and charge zones and the storage zone depends upon the differences in density of sulfur and the alkali metal polysulfides. Therefore, the device operates very effectively in the two phase region of charge or discharge. This region accounts for sixty percent (60%) of the capacity and has a flat (constant) voltage characteristic. Thus, for some applications where full capacity is not required, such as in electric utility load levelling, but where high charge-discharge energy efficiency is desired the operation of this device may be preferably limited to the two phase region.

The various polysulfide salts of the one phase region all have approximately the same density. Therefore, free convection is not as effective a means of mass transport in the one phase region. For example, during the discharge mode, when all the polysulfide in the storage zone is $Na_2S_{5.2}$ even though the reactant in individual cells of the discharge zone has progressed to $Na_2S_3$, free convection will essentially stop since these polysulfide salts have essentially the same density. Thus, in order to maintain flow in this one phase region it is necessary to heat the storage zone to a temperature greater than that of the discharge zone.

The problem of reduced convective flow is not so acute on charge since no matter what the state of the polysulfide salts, sulfur will be produced during charge and since sulfur is lighter than all the polysulfides, it rises. However, increased efficiency can be achieved by maintaining the storage zone at a temperature below that of the charge zone. This can be accomplished by either cooling the storage zone or not cooling the cells of the charge zone as much as would normally be done.

As should be apparent to those skilled in this art, it is necessary to return alkali metal produced on charge to the cells of the discharge zone. This may be accomplished by means of conduit 4 through which the alkali metal will flow as the cell is charged. It will also be appreciated that equivalent amounts of the alkali metal are necessary for reaction with sulfur. The alkali metal not contained in the individual cells, of course, may be stored in any suitable storage zone or even in transporting means 4.

As mentioned previously, it may be desirable to maintain a low or trickle charge on the cells of the charge zone during discharge if the electrode is subjected to corrosive attack by certain polysulfides. Our previously discussed alternative to this is to maintain the cells of the charge zone full of sulfur during discharge. This is possible as the device may be designed so that the charge or discharge zone of the device can be isolated from the storage zone depending on whether the device is being run in either the charge or discharge mode. A third alternative to avoid this corrosion problem, which is more acute with stainless steel, is to have one connecting conduit between the storage zone and the cells of the charge zone. If this is done, sinking $Na_2S_3$, the polysulfide which corrodes stainless steel will chemically react with rising sulfur to form $Na_2S_5$ in the connecting conduit and the charge cells will never be in contact with corrosive $Na_2S_3$.

The device described above in detail is the preferred embodiment and is not intended to be limiting. While it is preferable to orient the device in a gravitational field as described and rely on free convection, this is not necessary. The device may be oriented for one reason or another in such a manner as to reduce or eliminate the benefits of the chimney effect and free convective flow. In such a case it may be necessary or desirable to include pumping means in the means for transporting cathodic reactant. Of course, it also may be desirable to use pumping means to supplement a device which utilizes free convective flow as much as possible. FIG. 7 shows a schematic similar to FIG. 1 in which pumps have been included. The number and placement of pumps is not critical, but may depend on the flow desired or the orientation of the various zones.

In view of this desiclosure, many modifications of the improvement of this invention will be apparent to those skilled in the art. It is intended that all such modification which fall within the scope of this invention be included within the terms of the appended claims.

I claim:
1. A secondary battery comprising:
   A. A discharge zone comprising one or more cells adapted to operate in a discharge mode comprising
      1. One or more anodic reaction zones containing a molten alkali metal reactant-anode adapted to be in electrical contact with an external circuit,
      2. One or more cathodic reaction zones containing a cathodic reactant which is electrochemically reversibly reactive with said anodic reactant and which, when said cell is in operation comprises a composition selected from the group consisting of (i) a single phase composition comprising molten polysulfide salts and (ii) a two phase composition comprising molten sulfur and molten sulfur saturated polysulfide salts of said anodic reactant,
      3. A cation-permeable barrier to mass liquid transfer interposed between and in contact with said anodic and cathodic reaction zones,
      4. An electrode which is (i) disposed within said cathodic reaction zone, (ii) filled, at least in part, with said cathodic reactant, (iii) in electrical contact with said cation-permeable barrier, (iv) adapted to be in electrical contact with said external circuit, and (v) formed of a conductive material which exhibits a contact angle with said molten sulfur which is less than the contact angle it exhibits with molten polysulfide during operation of said cells
      5. Inlet and outlet means for flowing said cathodic reactant into and out of said cathodic reaction zones of said cells, and
      6. Inlet means for flowing said anodic reactant into said anodic reaction zones of said cells;
   B. A charge zone comprising one or more cells adapted to operate in a charge mode comprising
      1. One or more anodic reaction zones containing a molten alkali metal reactant-anode adapted to be in electrical contact with said external circuit,
      2. One or more cathodic reaction zones containing a cathodic reactant which is electrochemically reversibly reactive with said anodic reactant and which, when said cell is in operation comprises a composition selected from the group consisting of (i) a single phase composition comprising molten polysulfide salts and (ii) a two phase composition comprising molten sulfur and molten sulfur saturated polysulfide salts of said anodic reactant,
      3. A cation-permeable barrier to mass liquid transfer interposed between and in contact with said anodic and cathodic reaction zones,
      4. An electrode which is (i) disposed within said cathodic reaction zone (ii) filled, at least in part, with said cathodic reactant, (iii) in electrical contact with said cation-permeable barrier, (iv) adapted to be in electrical contact with said external circuit, and (v) formed of a conductive material which exhibits a contact angle with said molten polysulfide which is less than the contact angle it exhibits with molten sulfur during operation of said cell,
      5. Inlet and outlet means for flowing said cathodic reactant into and out of said cathodic reaction zones of said cells, and
      6. Outlet means for flowing said anodic reactant out of said anodic reaction zones of said cells;
   C. A storage zone adapted to store cathodic reactant which comprises a composition selected from the group consisting of (i) a single phase composition comprising molten sulfur, (ii) a single phase composition comprising molten polysulfide, and (iii) a two phase composition comprising molten sulfur and molten sulfur saturated polysulfide;
   D. Means for transporting said cathodic reactant between said storage zone and said charge and discharge zones; and
   E. Means for transporting alkali metal-anodic reactant from said charge zone to said discharge zone.

2. A battery in accordance with claim 1 wherein said electrode in said cells of said discharge zone comprises porous conductive material which is disposed within said cathodic reaction zone so as to create a plurality of channels or spaces which are free of said porous conductive material and which in combination with said porous conductive material are adapted to allow flow within said cathodic reaction zone of said cathodic reactant during operation of said cell.

3. A battery in accordance with claim 1 wherein said conductive material in the cells of said charge zone is selected from the group consisting of:
   A. porous conductive material which is disposed within said cathodic reaction zone such that said zone contains a plurality of channels or spaces which are free of said porous conductive material, are adapted to allow flow within said zone of said cathodic reactant during operation of said cell;
   B. porous conductive material which is confined to an area of said cathodic reaction zone adjacent to said cation-permeable barrier; and
   C. two major electrode portions, the first being porous conductive material which is confined to an area of said cathodic reaction zone adjacent to said cation-permeable barrier, and the second being a conductive material which is electrically connected to said first portion, but which is spaced from said first portion so as to create a channel therebetween.

4. A battery in accordance with claim 1 wherein the device is oriented in a gravicational field with said discharge zone at the top, said charge zone at the bottom and said storage zone intermediate between the two.

5. A battery in accordance with claim 1 wherein both said discharge zone and said charge zone include upper and lower manifold reservoirs, said upper manifold reservoir in said discharge zone and said lower manifold reservoir in said charge zone being adapted to (i) receive said cathodic reactant from said means for transporting cathodic reactant and (ii) feed said cathodic reactant so received into said cells through said inlet means and said lower manifold reservoir in said discharge zone and said upper manifold reservoir in said charge zone being adapted to (i) receive said cathodic reactant from said cells through said outlet means and (ii) feed said cathodic reactant so received to said means for transporting said cathodic reactant.

6. A battery in accordance with claim 1 wherein said means for transporting said cathodic reactant comprises at least one elongated conduit between said storage zone and said discharge zone, at least one elongated conduit between said storage zone and said charge zone, and pumping means for transporting said cathodic reactant therethrough.

7. A battery in accordance with claim 1 wherein the device includes means for isolating said discharge or charge zone from said storage zone when cells of the other zone are operating.

8. A battery in accordance with claim 1 wherein said cells of said charge zone are adapted so as to maintain a continuous low charging current flowing through the electrodes thereof during discharge of said battery or cell.

9. A battery in accordance with claim 2 wherein said porous conductive material is selected from the group consisting of graphite felt, graphite foam, porous graphite, vitreous carbon foam, pyrolytic graphite felt, pyrolytic graphite foam, and materials coated or covered with the same.

10. A battery is accordance with claim 3 wherein said conductive material is selected from the group consisting of:
  1. a metal;
  2. materials having a surface consisting of an oxide or sulfide of a metal selected from the group consisting of (i) metals of Groups I, II and III of the Periodic Table of Elements, (ii) Transition Series Metals and (iii) tin, lead, antimony and bismuth;
  3. surface oxidized graphite;
  4. intercalated graphite;
  5. graphite coated with materials of (1), (2), (3) or (4); and
  6. a mixture of (1), (2), (3), (4) or (5).

11. A battery in accordance with claim 4 wherein said means for transporting said cathodic reactant comprises at least one elongated conduit between said storage zone and of said discharge zone and at least one elongated conduit between said storage zone and said charge zone.

12. A battery in accordance with claim 4 wherein said means for transporting said cathodic reactant is adapted so as to promote transport of said cathodic reactants by free convection and comprises at least two elongated conduits between said storage zone and said discharge zone and at least two elongated conduits between said storage zone and said charge zone, one of each of said two elongated conduits being adapted so as to transport said cathodic reactant into said storage zone from said charge or discharge zone and the other of said elongated conduits being adapted so as to transport said cathodic reactant from said storage zone to said charge or discharge zone.

13. A battery in accordance with claim 4 wherein said storage zone is adapted to be maintained at a temperature above the temperature of said discharge zone during discharge of said battery and below the temperature of said charge zone during charge of said battery.

14. A battery in accordance with claim 12 wherein both said discharge zone and said charge zone include upper and lower manifold reservoirs, said upper manifold reservoir in said discharge zone and said lower manifold reservoir in said charge zone being adapted to (i) receive said cathodic reactant from said means for transporting cathodic reactant and (ii) feed said cathodic reactant so received into said cells through said inlet means and said lower manifold reservoir in said discharge zone and said upper manifold reservoir in said charge zone being adapted to (i) receive said cathodic reactant from said cells through said outlet means and (ii) feed said cathodic reactant so received to said means for transporting said cathodic reactant.

15. A second battery comprising:
  A. Discharge and charge zones each containing one or more cells comprising
    1. a container,
    2. a cation-permeable barrier to mass liquid transfer which is disposed within said container so as to create an anodic reaction zone within said barrier and a cathodic reaction zone between said barrier and said container,
    3. a molten alkali metal anodic reactant within said anodic reaction zone which is adapted to be in electrical contact with an external circuit,
    4. a cathodic reactant which is electrochemically reversibly reactive with said anodic reactant and which, when said cell is in operation, comprises a composition selected from the group consisting of (i) a single phase composition comprising molten polysulfide salts and (ii) a two phase composition comprising molten sulfur and molten sulfur saturated polysulfide salts of said anodic reactant,
    5. An electrode which is (i) disposed within said cathodic reaction zone, (ii) filled, at least in part, with said cathodic reactant, (iii) in electrical contact with said cation-permeable barrier and (iv) adapted to be in electrical contact with said external circuit, and
    6. inlet and outlet means for flowing said cathodic reactant into and out of said cathodic reaction zones of said cells;

said cells in said discharge zone being adapted to operate in a discharge mode and said electrode of said cells being formed of a conductive material which exhibits a contact angle with said molten sulfur which is less than the contact angle it exhibits with said molten polysulfide during operation of said cell, and said cells in said charge zone being adapted to operate in a discharge mode and said electrode of said cells being formed of a conductive material which exhibits a contact angle with said molten polysulfide which is less than it exhibits with said molten sulfur during operation of said cell;

B. A storage zone adapted to store cathodic reactant which comprises a composition selected from the group consisting of (i) a single phase composition comprising molten sulfur, (ii) a single phase composition comprising molten polysulfide, and (iii) a two phase composition comprising molten sulfur and molten sulfur saturated polysulfide;

C. Means for transporting said cathodic reactant between said storage zone and said charge and discharge zones; and D. Means for transporting alkali metal-anodic reactant from said charge zone to said discharge zone.

16. A battery in accordance with claim 15 wherein said electrode in said cells of said discharge zone comprises porous conductive material which is disposed within said cathodic reaction zone so as to create a plurality of chambers or spaces which are free of said porous conductive material and which in combination with said porous conductive material are adapted to allow flow within said cathodic reaction zone of said cathodic reactant during operation of said cell.

17. A battery in accordance with claim 15 wherein said conductive material in the cells of said charge zone is selected from the group consisting of:

A. porous conductive material which is disposed within said cathodic reaction zone such that said zone contains a plurality of channels or spaces which are free of said porous conductive material which, in combination with said porous conductive material, area adapted to allow flow within said zone of said cathodic reactant during operation of said battery or cell;

B. porous conductive material which is confined to an area of said cathodic reaction zone adjacent to said cation-permeable barrier; and C. two major electrode portions, the first being porous conductive material which is confined to an area of said cathodic reaction zone adjacent to said cation-permeable barrier, and the second being a conductive material which is electrically connected to said first portion, but which is spaced from said first portion so as to create a channel therebetween 18. A battery in accordance with claim 15 wherein the device is oriented in a gravitational field with said discharge zone at the top, said charge zone at the bottom and said storage zone intermediate between the two.

19. A battery in accordance with claim 15 wherein both said discharge zone and said charge zone include upper and lower manifold reservoirs, said upper manifold reservoir in said discharge zone and said lower manifold reservoir in said charge zone being adapted to (i) receive said cathodic reactant from said means for transporting cathodic reactant and (ii) feed said cathodic reactant so received into said cells through said inlet means, and said lower manifold reservoir in said discharge zone and said upper manifold reservoir in said charge zone being adapted to (i) receive said cathodic reactant from said cells through said outlet means and (ii) feed said cathodic reactant so received to said means for transporting said cathodic reactant.

20. A battery in accordance with claim 15 wherein said means for transporting said cathodic reactant comprises at least one elongated conduit between said storage zone and said discharge zone, at least one elongated conduit between said storage zone and said charge zone, and pumping means for transporting said cathodic reactant therethrough.

21. A battery in accordance with claim 15 wherein the device includes means for isolating said discharge or charge zone from said storage zone when cells of the other zone are operating.

22. A battery in accordance with claim 15 wherein said cells of said charge zone are adapted so as to maintain a continuous low charging current flowing through the electrodes thereof during discharge of said battery or cell.

23. A battery in accordance with claim 16 wherein said porous conductive material is selected from the group consisting of graphite felt, graphite foam, porous graphite vitreous carbon foam, pyrolytic graphite foam, pyrolytic graphite felt, and materials coated or covered with the same.

24. A battery in accordance with claim 17 wherein said conductive material is selected from the group consisting of:

1. a metal;
2. materials having a surface consisting of an oxide or sulfide of a metal selected from the group consisting of (i) metals of Groups I, II, and III of the Periodic Table of Elements, (ii) Transition Series Metals, and (iii) tin, lead, antimony and bismuth;
3. surface oxidized graphite;
4. intercalated graphite;
5. graphite coated with materials of (1), (2), (3) or (4); and
6. a mixture of (1), (2), (3), (4) or (5).

25. A battery in accordance with claim 17 wherein said electrode in the cells of said charge zone is a perforated metal sheet which is contiguous with the wrapped around said cation-permeable barrier.

26. A battery in accordance with claim 17 wherein said electrode of the cells in said charging zone comprises two major portions, the first being a perforated metal sheet which is contiguous with and wrapped around said cation-peremeable barrier, and the second being a metal cylinder surrounding said first portion and electrically connected with said first portion, but spaced from the same so that a channel is formed between the two portions.

27. A battery in accordance with claim 25 wherein said cation-permeable barrier is tubular and said perforated metal sheet is stainless steel.

28. A battery in accordance with claim 18 wherein said means for transporting said cathodic reactant comprises at least one elongated conduit between said storage zone and said discharge zone and at least one elongated conduit between said storage zone and said charge zone.

29. A battery in accordance with claim 18 wherein said means for transporting said cathodic reactant is adapted so as to promote transport of said cathodic reactants by free convection and comprises at least two elongated conduits between said storage zone and said discharge zone and at least two elongated conduits between said storage zone and said charge zone, one of each of said two elongated conduits being adapted so as to transport said cathodic reactant into said storage zone from said charge or discharge zone and the other of said elongated conduits being adapted so as to transport said cathodic reactant from said storage zone to said charge or discharge zone.

30. A battery in accordance with claim 18 wherein said storage zone is adapted to be maintained at a temperature above the temperature of said discharge zone during discharge of said battery and below the temperature of said charge zone during charge of said battery.

31. A battery in accordance with claim 29 wherein both said discharge zone and said charge zone include upper and lower manifold reservoirs, said upper manifold reservoir in said discharge zone and said lower manifold reservoir in said charge zone being adapted to (i) receive said cathodic reactant from said means for transporting cathodic reactant and (ii) feed said cathodic reactant so received into said cells through said inlet means and said lower manifold reservoir in said discharge zone and said upper manifold reservoir in said charge zone being adapted to (i) receive said cathodic reactant from said cells through said outlet means and (ii) feed said cathodic reactant so received to said means for transporting said cathodic reactant.

* * * * *